US008060414B1

(12) United States Patent
Lin et al.

(10) Patent No.: US 8,060,414 B1
(45) Date of Patent: Nov. 15, 2011

(54) ENCODING AND DECODING OF PRODUCT PROPERTIES IN A UNIFORM RESOURCE LOCATOR

(75) Inventors: Shane S. Lin, Seattle, WA (US); Shih-Ta Peng, Bellevue, WA (US); Eric C. Williams, Aliso Viejo, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/787,181

(22) Filed: May 25, 2010

(51) Int. Cl.
*G06Q 30/00* (2006.01)

(52) U.S. Cl. ...................................... 705/26.5; 705/26.1

(58) Field of Classification Search .................... 705/26, 705/27
See application file for complete search history.

(56) References Cited

U.S. PATENT DOCUMENTS 6,917,972 B1 * 7/2005 Basko et al. .................. 709/224
7,082,454 B1 * 7/2006 Gheith .......................... 709/203
7,610,400 B2 * 10/2009 L'Heureux et al. ........... 709/237
7,681,139 B1 * 3/2010 Lettau ........................... 715/765
7,698,269 B2 * 4/2010 Zhou et al. ............. 707/999.006
2002/0019857 A1 * 2/2002 Harjanto ....................... 709/219
2003/0028451 A1 * 2/2003 Ananian ......................... 705/27
2004/0015408 A1 * 1/2004 Rauen et al. .................... 705/26
2004/0019658 A1 * 1/2004 Plastina et al. ................ 709/217
2005/0278231 A1 * 12/2005 Teeter ............................ 705/26
2007/0214129 A1 * 9/2007 Ture et al. ......................... 707/4
2009/0006614 A1 * 1/2009 Le et al. ........................ 709/224
2009/0287961 A1 * 11/2009 Austin ............................ 714/37

OTHER PUBLICATIONS

Udell, J., E-payment Alternatives, www.byte.com, Mar. 22, 2000.*

* cited by examiner

*Primary Examiner* — Adam Levine
*Assistant Examiner* — Ethan D Civan
(74) *Attorney, Agent, or Firm* — Thomas, Kayden, Horstemeyer & Risley, LLP

(57) ABSTRACT

Disclosed are various embodiments for generating bundle uniform resource locators (URL). A URL is generated that contains a parameter with a value corresponding to a product available in the electronic commerce system. At least one parameter with a value corresponding to configurable features of the product is also encoded in the URL. The URL parameters are validated to determine whether the product and configurable features are compatible.

25 Claims, 10 Drawing Sheets

Browser
File Edit View Bookmarks Tools Help
301
http://www.e-commerce.site/bundle?ph1=223&pl1.0=214&acc1.0=443&acc1.1=5567&ph2=456&pl2.0=214&acc2.0=332&pl2.1=777

Phones
Accessories
Carrier Plans

Flip Phone
Compact
3G
Headphone Compatible
Reviews

Smart Phone
Wi-Fi
3G
Bluetooth
Reviews

Flip Phone
WirelessGiant 1800 Family Plan
*2 year agreement
Car Charger Accessory
Leather Carrying Case Smart Phone
WirelessGiant 1800 Family Plan
*2 year agreement
200GB per month Data Plan
Bluetooth Headset Bundle Price: $219.99
Add to Cart

126

ENCODING AND DECODING OF PRODUCT PROPERTIES IN A UNIFORM RESOURCE LOCATOR

BACKGROUND

In an electronic commerce system, bundles containing one or more products, product attributes, and/or features are assembled by users to browse, purchase, share, etc. Bundles are often generated with the use of form data or through the use of a user interface workflow generated by the electronic commerce system. This can make providing a link to the bundle for the purposes of sharing or driving traffic to the electronic commerce system difficult.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure disclose various systems and methods that achieve the encoding of parameters in a uniform resource locator (URL) that facilitate the purchasing, linking, and sharing of products sold in an electronic commerce system. The URL parameters can describe the products as well as various accessories, features and options that may available in connection with the purchase of the item. In this way, embodiments of the disclosure facilitate the generating of hyperlinks to bundles of one or more products and the various customizations a user may make. Accordingly, these links can be shared by a user with others as well as used for other purposes as will be described herein. In one embodiment of this disclosure, URL's generated by a system or method described herein can be used in an electronic commerce system configured to display and/or sell mobile devices, wireless devices, cellular telephones, etc., that are often paired with a carrier plan as well as accessories. Accordingly, in the following discussion, a general description of systems and methods facilitating the above is provided, followed by a discussion of the operation of the same.

Figure 1:
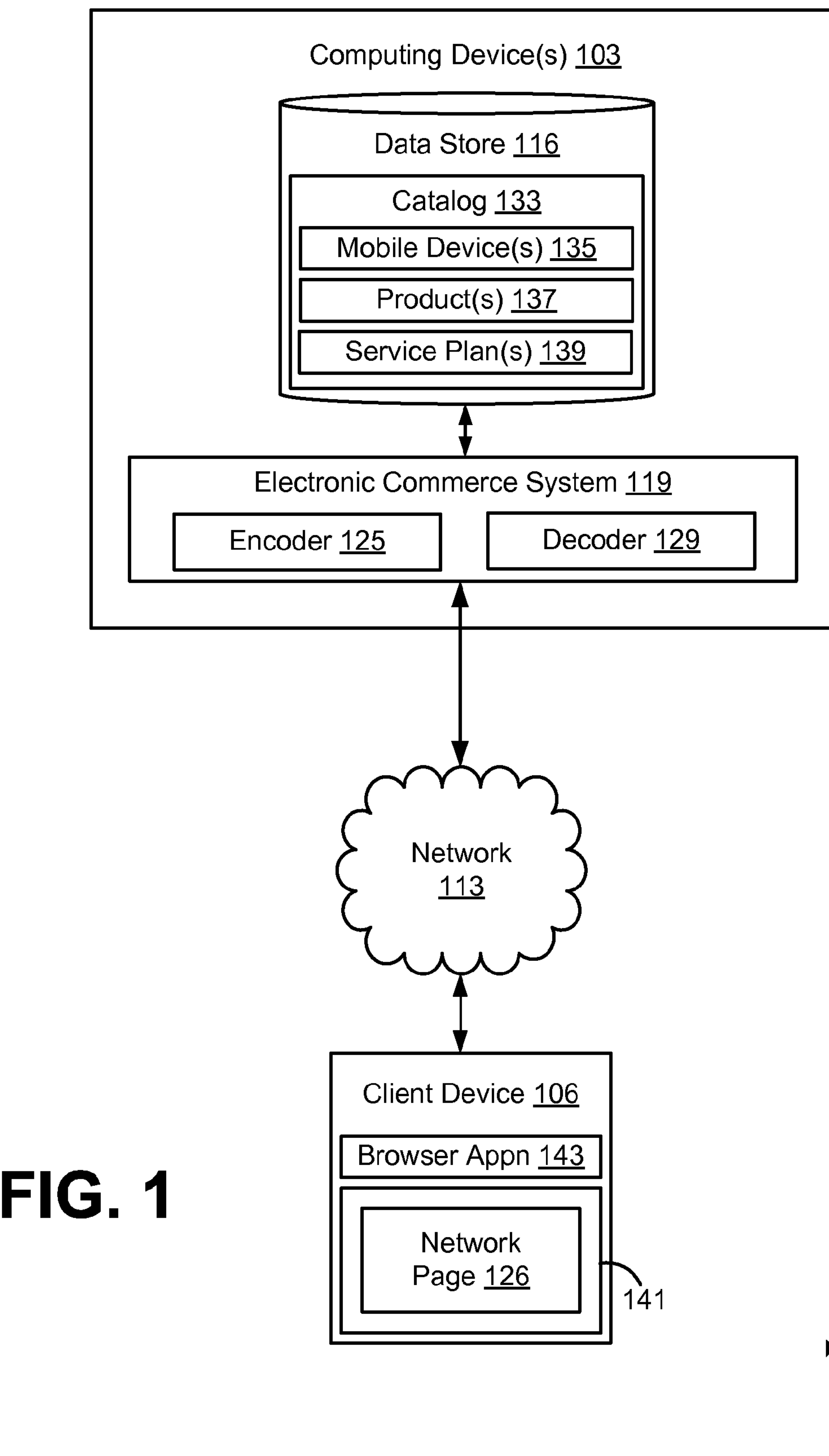
FIG. 1 is a drawing of a networked environment according to various embodiments of the present disclosure.

With reference to FIG. 1, shown is a networked environment 100 according to various embodiments. The networked environment 100 includes one or more computing devices 103 and one or more client devices 106 coupled to a network 113. The network 113 includes, for example, the Internet, intranets, extranets, wide area networks (WANs), local area networks (LANs), wired networks, wireless networks, or other suitable networks, etc., or any combination of two or more such networks.

The computing device(s) 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 116 that is accessible to the computing device 103. The data store 116 may be representative of a plurality of data stores as can be appreciated. The data stored in the data store 116, for example, is associated with the operation of the various applications and/or functional entities described below. In one embodiment, the data store 116 can be implemented in one computing device 103, and the other elements depicted can be implemented in other computing devices 103 as can be appreciated.

The components executed on the computing device 103 include, for example, an electronic commerce system 119 and other systems, applications, services, processes, engines, or functionality not discussed in detail herein. The electronic commerce system 119 is executed in order to facilitate the online viewing and/or purchase of items such as, for example, mobile devices, wireless devices, device accessories, and carrier plans over the network 113. The terms "mobile device" and "wireless device" may be used interchangeably herein, and it should be appreciated that various types of devices are termed by those of ordinary skill in the art as a "mobile device" or, alternatively, a "wireless device."

Such mobile devices may comprise, for example, personal digital assistants, tablet devices, smart phones, cellular telephones, computers, and other devices. However, it is understood that the electronic commerce system 119 may ultimately facilitate the purchase of any type of item. The electronic commerce system 119 also performs various back-end functions associated with the online presence of a merchant in order to facilitate the online purchase of items as will be described. For example, the electronic commerce system 119 generates network pages 126 such as web pages or other types of network content that are provided to client devices 106 in response to requests for the purposes of selecting items for purchase, rental, download, lease, or any other form of consumption and to perform other tasks as will be described. Among other applications, the electronic commerce system 119 includes a URL encoder 125 and a URL decoder 129 that are executed in order to encode and/or decode URL's generated as described herein.

The data stored in the data store 116 includes, for example, a catalog 133 that includes a listing of various items such as, for example, mobile devices 135, other products 137 (e.g., accessories, etc.), and potentially other data. In addition, the catalog 133 includes a listing of service plans 139 that may be sold in association with a mobile device 135. The service plans 139 are offered by various service providers. For example, a service plan 139 may involve wireless service for a mobile device. In one embodiment, a mobile device may be sold in association with a given service plan 139 as a package deal or a bundle, or they may be sold separately. Additionally, a user may purchase a mobile device 135 and link the mobile device 135 with more than one service plan 139. As a non-limiting example, a user may purchase a mobile device 135 and link a voice service plan 139, a data service plan 139 as well as a short message service (SMS) plan 139 with the mobile device.

The data store 116 can also contain identifiers associated with each of the mobile devices 135, products 137, and service plans 139 and can uniquely identify each within the catalog 133. In this way, a URL parameter can have a value associated with an identifier in order to uniquely reference one of these items from the catalog 133, as will be described in further detail herein.

The client device 106 is representative of a plurality of client devices 106 that may be coupled to the network 113. The client device 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. The client device 106 includes a display device 141 upon which various network pages 126 and other content may be rendered.

The client device 106 may be configured to execute various applications such as a browser application 143 and/or other applications. The browser application 143 may be executed in a client device 106, for example, to access and render network pages 126, such as web pages, or other network content served up by the computing device 103 and/or other servers. The client device 106 may be configured to execute applications beyond browser application 143 such as, for example, email applications, instant message applications, and/or other applications.

Next, a general description that provides one example of the operation of the various components of the networked environment 100 is provided. The electronic commerce system 119 can allow a user on a client 106 to view, browse, and/or purchase a mobile device 135. Additionally, the user can configure a mobile device 135 with one or more service plans 139, accessories, and other options and/or features as can be appreciated. Accordingly, the URL encoder 125 can generate a URL corresponding to the selections of a user.

In one embodiment, the encoder 125 can generate a URL parameter having a value corresponding to an identifier for a mobile device 135 that uniquely identifies the mobile device 135 in the catalog 133 of the data store 113. In other embodiments, the value of the URL parameter corresponding to the selected mobile device 135 can be a hash value corresponding to a unique identifier of a mobile device 135 in the data store 113. Additionally, because mobile devices 135 are often offered to users as a part of a bundle that includes features such as a service plan 139, accessories, or other options and features, the encoder 125 can append parameters to the URL corresponding to each of these features. Accordingly, the encoder 125 appends a value corresponding to these features that uniquely identifies them in the catalog 133.

In some embodiments, rather than choosing a pre-configured bundle provided by the electronic commerce system 119, a user, when purchasing a mobile device 135 in an electronic commerce system 119, often configures the mobile device 135 with features as described above. Accordingly, the electronic commerce system 119 can encode a user interface for display on a client 106 that allows the user to select a mobile device 135 and then configure the mobile device 135 with various service plans 139, accessories, and/or other products 137. For example, a user may configure a bundle containing a mobile device 135 and multiple service plans 139 as well as accessories for the mobile device 135 such as a headset, carrying case, power adapter, etc. Because the mobile device 135, service plans 139, and accessory products 137 can be uniquely identified in the catalog 133, the encoder 135 generates URL parameters having values that correspond to such a unique identifier.

A bundle offered to or configured by a user can also contain multiple mobile devices 135. Accordingly, the encoder 125 can generate parameters corresponding to each mobile device in a bundle having values that identify the mobile device 135 in the catalog 133 as described above. Additionally, the encoder 125 can generate the parameters such that each parameter has a parameter name that uniquely identifies it within the generated URL. As a non-limiting example, if a bundle configured by a user contains two mobile devices 135, the encoder 125 can generate a first parameter "phone1" having a value corresponding to a catalog 133 identifier of the first mobile device. The encoder 125 can then generate a second parameter "phone2" having a value corresponding to a catalog 133 identifier of the second mobile device.

Additionally, in the case of a bundle containing multiple mobile devices 135, the encoder 125 can also generate parameters corresponding to features (e.g., service plans 139, products 137, etc.) associated with each mobile device 135 in the bundle. The encoder 125 also generates the parameter names corresponding to these features such that they can be associated with the mobile device 135 which the user intended. As a non-limiting example, a parameter identifying a mobile device 135 selected by the user can contain an identifier (e.g., an integer), and the parameters corresponding to features can contain the same identifier so that they can be associated with the proper mobile device 135.

Additionally, as a selected mobile device 135 can be associated with multiple service plans 139 and multiple other products 137, a second identifier can be added to differentiate the service plans 139 and products 137 from one another. As a non-limiting example, in the above scenario where a mobile device 135 is associated with a URL parameter having a name "phone1," the encoder 125 can generate parameters for a first service plan 139 that has the name, "plan1.0," so that the "1"

associates the service plan 139 with the "phone1" parameter, and the "0" designates the service plan 139 as the first service plan. In other embodiments, parameters associated with a particular mobile device 135 can be grouped together and separated with a delimiter. Other variations of the above should be appreciated by a person of ordinary skill in the art.

The electronic commerce system 119 also includes a URL decoder 129 that is configured to parse and decode a URL that includes URL parameters as described above. The decoder 129 can determine a mobile device 135, other products 127, and service plans 129 referenced by URL parameters in a URL generated by the encoder, and facilitate the generating of a user interface by the electronic commerce system 119 that includes the products and services from the catalog 133. The decoder 129 can also perform validation of a URL and parameters that are associated with mobile devices 135, other products 137, service plans 139, etc. The validation step can ensure that a given bundle represented by the URL parameters and their values constitutes a valid bundle of mobile devices 135, products 137, and service plans 139.

As a non-limiting example, a carrier may require, with the purchase and activation of a mobile device 135 on the carrier's network, that a user activate the device with a voice service plan 139 as well as a data service plan 139. Accordingly, if the URL parameters fail to reference a voice service plan 139 and a data service plan 139, the decoder can cause the electronic commerce system 119 to generate a user interface displayed on the client 106 that includes an error message. Additionally, the decoder 129 can cause the electronic commerce system 119 to prevent the user from purchasing such an invalid bundle of a mobile device 135 and service plans 139. The validation capabilities of the decoder 129 also facilitate the prevention of fraud, as it can prevent a user from modifying the URL parameters to generate an invalid bundle of products and services. As yet another example, the validation capabilities of the decoder 129 can determine whether a mobile device 135, service plan 139 and/or other product 137 has been rendered obsolete or replaced with a successor product or service. Accordingly, the decoder 129 can facilitate suggestion of similar products and/or services that are deemed as replacement and/or successor products to those specified by the URL parameters.

Figure 2:
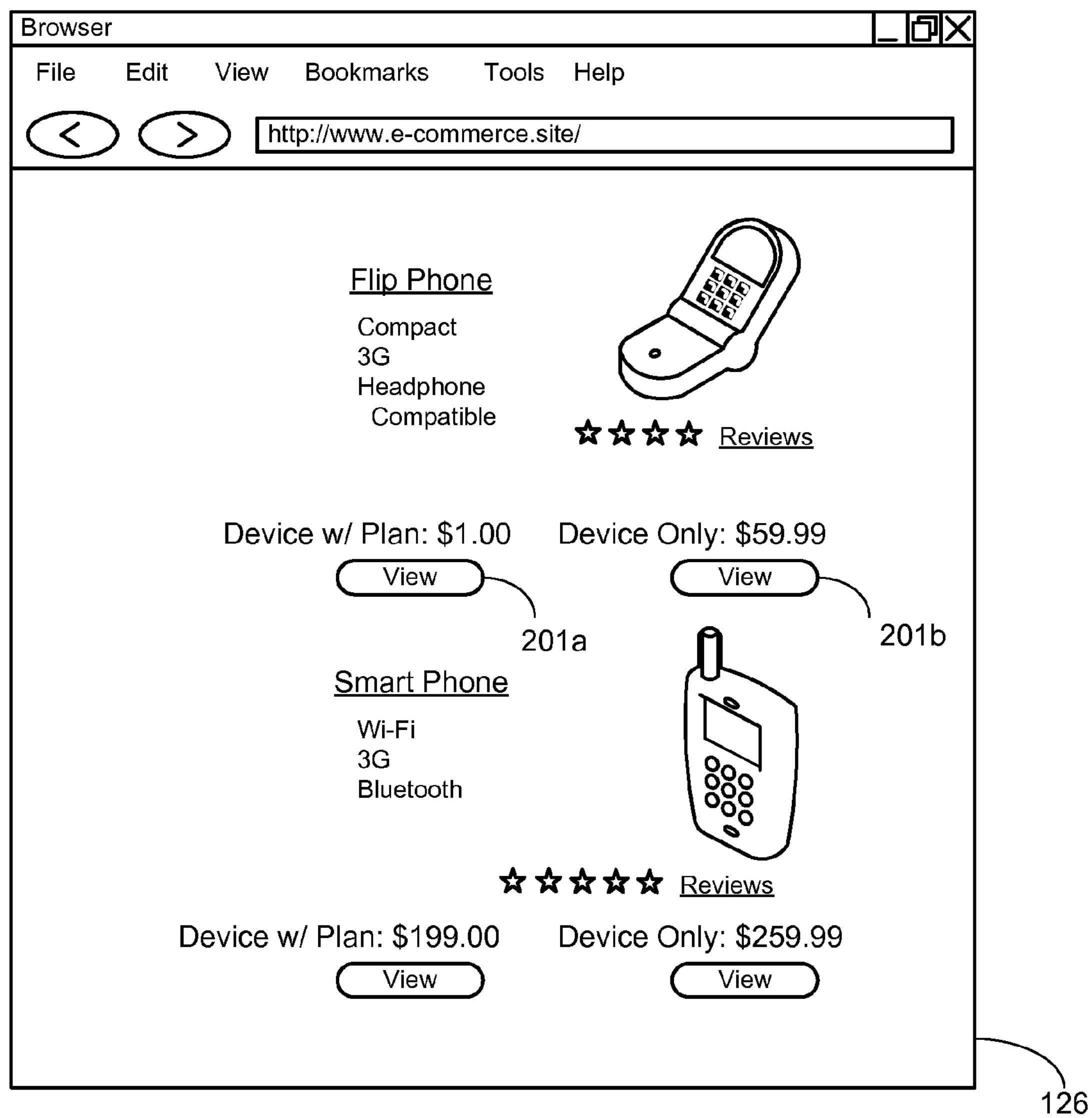
FIG. 2 is a drawing of an example of a network page rendered by a client in the networked environment of FIG. 1 according to various embodiments of the present disclosure.

Referring next to FIG. 2, shown is one example of a user interface in a network page 126 (FIG. 1) rendered by a client 106 and generated by the electronic commerce system 119. The network page 126 of FIG. 2 depicts one example of a page generated by the electronic commerce system 119 from which a user on a client can begin to assemble a bundle of mobile devices 135, other products 137, and/or service plans 139. The depicted network page 126 generated by the electronic commerce system 119 can include hyperlinks 201 that are associated with URL's generated by the encoder 125. The depicted hyperlink 201*a* allows a user to add a pre-configured bundle of a mobile device 135, and other products and services. Also depicted is a hyperlink 201*b* that allows a user to add a mobile device 135 to a virtual shopping cart and configure the other features, products 137 and service plans 139 of the bundle.

Figure 3:
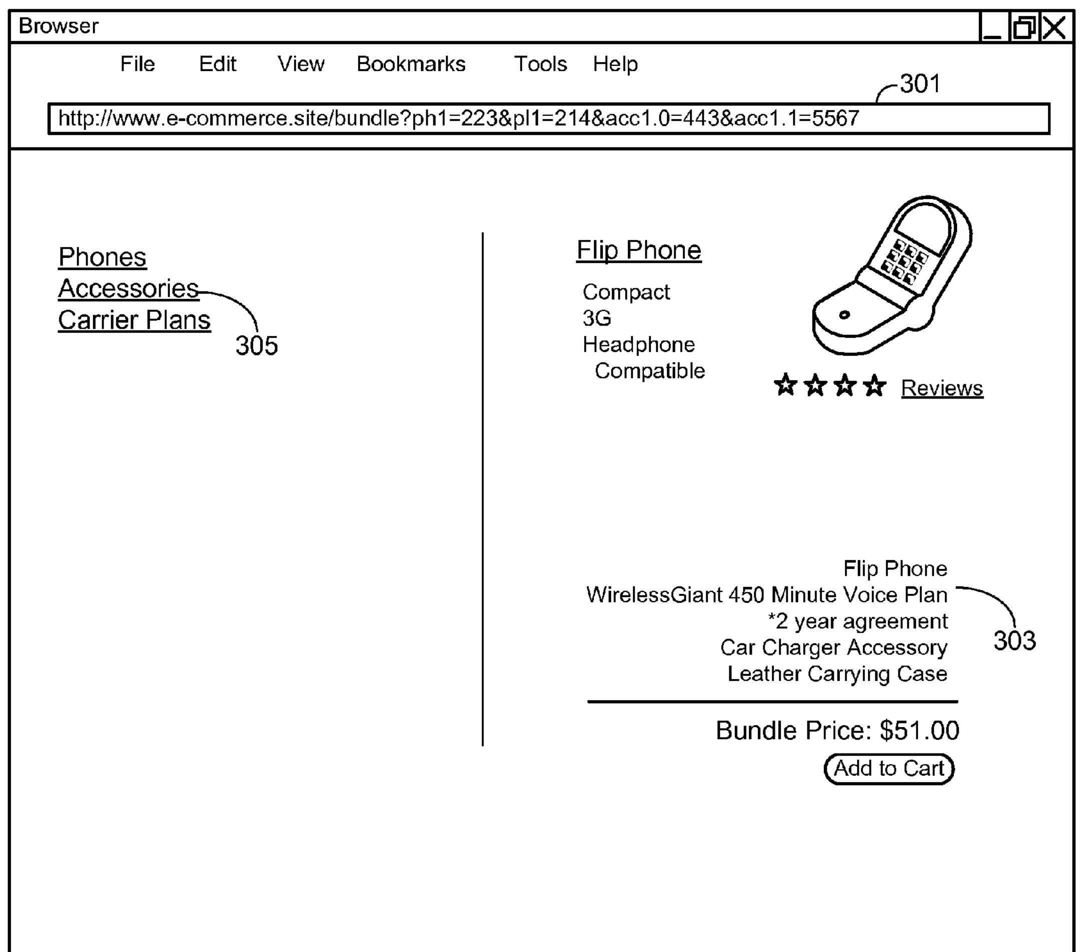
FIG. 3 is a drawing of an example of a network page rendered by a client in the networked environment of FIG. 1 according to various embodiments of the present disclosure.

Reference is now made to FIG. 3, which depicts an alternative network page 126 (FIG. 1) rendered by a client 106 that is generated by the electronic commerce system 119. In the depicted network page 126, a user has configured a product bundle by manipulating various user interface elements on the client 106. Also shown in FIG. 3 is a URL 301 associated with the depicted network page 126 that shows various URL parameters that can be generated by the encoder 125 in one non-limiting example. In the depicted example, the user configured bundle 303 contains a mobile device 135 with various other bundle features, such as a service plan 139 and other products 137.

The user can configure a product bundle 303 by manipulating various user interface elements, such as, for example, by browsing the depicted product hierarchy 305 and adding products 137, service plans 139, etc., to the bundle. When a user selects a mobile device 135 and/or feature to add to the product bundle 303, the encoder 125 generates an updated URL by appending parameters corresponding to the selected mobile device 135 and/or feature as well as a corresponding identifier that identifies the selection in the catalog 133 (FIG. 1). The decoder 129 can then parse the URL to facilitate display of the items selected by the user as well as validation of the product bundle 303.

In the depicted example, the product bundle 303 contains a mobile device 135 and various features that include a service plan 139 as well as other accessory products 135. Accordingly, the URL 301 reflects the selections of the user. In the non-limiting example of FIG. 3, the URL 301 contains a "ph1" parameter with a value corresponding to an identifier in the catalog 133 of the selected mobile device 135. The URL 301 also contains a "pl1" parameter with a value corresponding to an identifier in the catalog of the selected service plan 139. The URL 301 also contains parameters "acc1.0" and "acc1.1" that correspond to the accessories chosen by the user to add to the bundle.

It should be appreciated that in some embodiments, the URL 301 can be encoded such that a bundle is represented in a URL using an alternative URL encoding scheme. As one example, a bundle can be represented by a single URL parameter having a value that corresponds to identifiers in the catalog for all of the various components of a bundle. These values can be separated by a delimiter character, and because the identifiers can correspond to a unique identifier in a catalog, the identifiers can be embedded in a single URL parameter because of their uniqueness. In the example of a single URL parameter that has a value describing an entire bundle, the value of the URL parameter can be further encoded with one or more other encoding schemes, such as, but not limited to, a base 64 encoding. In this way, the identifiers corresponding to items in a catalog can take any form, even if they include characters that are incompatible with a URL, and such an encoding can ensure that the value of the URL parameter(s) only include acceptable URL characters.

In other embodiments, the URL 301 can be encoded such that each mobile device and/or product in a bundle can be represented by a URL parameter having a value that corresponds to an identifier associated with the product in the catalog. Identifiers corresponding to other configurable features of the mobile device and/or product can be appended to the identifier corresponding to the mobile device. In this way, there can be one URL parameter corresponding to each mobile device in a bundle that has a value describing the device itself and the configurable features and/or accessories corresponding to the mobile device.

In another embodiment, URL parameters and/or values of the URL parameters can be hashed, encrypted and/or scrambled by the encoder 125 so that the values corresponding to the mobile device, configurable features, service plans, etc., are hidden from a user. Accordingly, the decoder 129 can employ a reverse hash function, decryption function and/or descrambling function in order to determine the various aspects of the bundle encoded in the URL 301.

Accordingly, when a URL 301 generated by the encoder 125 is processed by the electronic commerce system 119 in order to generate a user interface for a client 106, the decoder 129 can validate the URL 301. In the example of FIG. 3, the decoder 129 can determine whether the chosen service plan 139 is compatible with the selected mobile device 135. As a non-limiting example, if the selected mobile device 135 is a carrier specific phone that is intended for use with a first carrier, and the service plan 139 chosen by the user is a plan from a second carrier, the bundle 303 may be invalid. Accordingly, the decoder 129 can return an error, preventing a potentially invalid product bundle 303 from being purchased by the user. Upon validation of the bundle 303 by the decoder 129, the electronic commerce system 119 can calculate pricing for the product bundle 303 configured by the user and generate the depicted network page 126 for display on a client 106.

Figure 4:
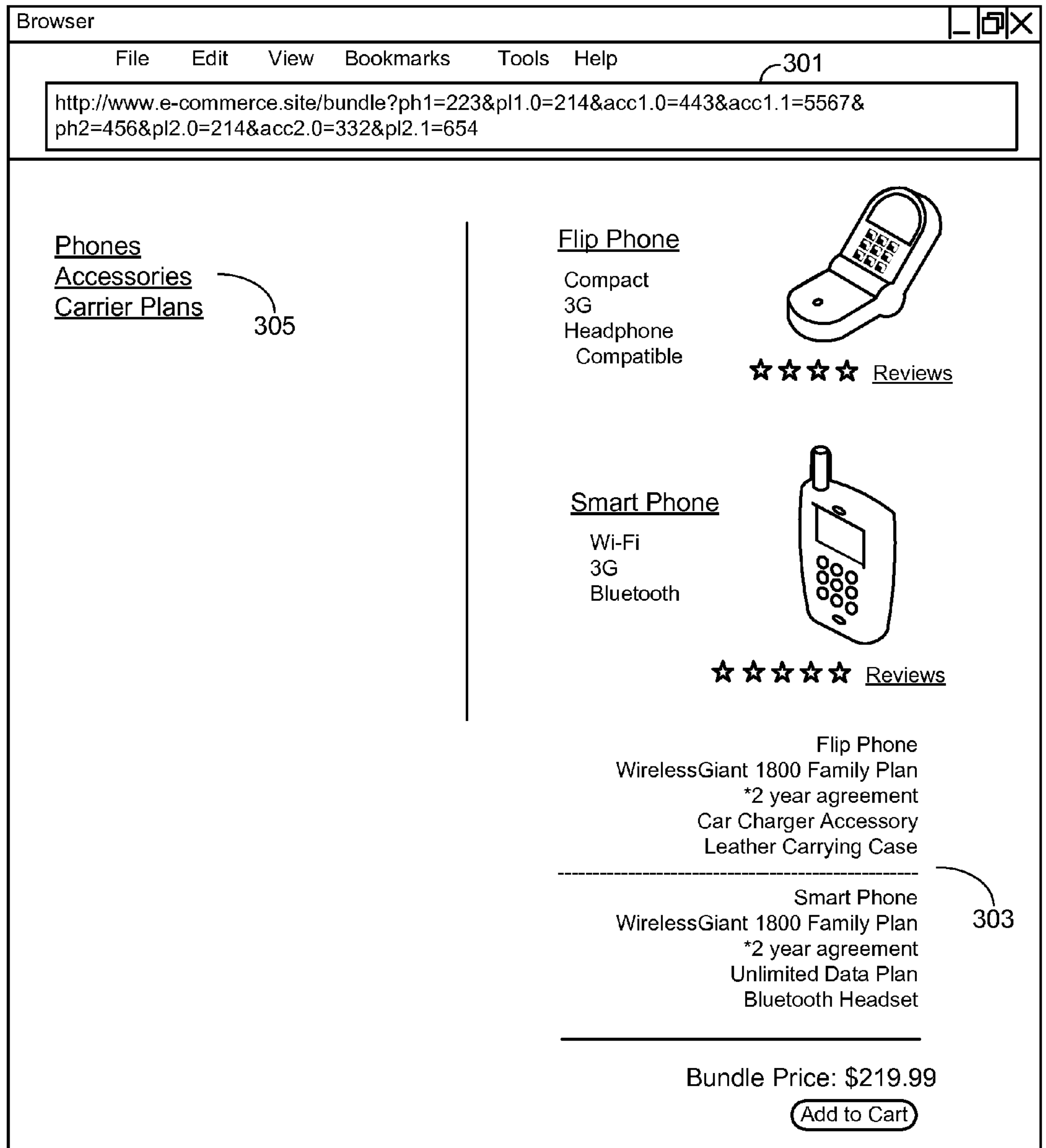
FIG. 4 is a drawing of an example of a network page rendered by a client in the networked environment of FIG. 1 according to various embodiments of the present disclosure.

Reference is now made to FIG. 4, which depicts an alternative network page 126 generated by the electronic commerce system 119 and rendered on a client 106. In the depicted example, the product bundle 403 contains two mobile devices 135, and each of the mobile devices 135 is associated with various feature customizations. Each of the depicted mobile devices 135 is associated with various accessory products 137 selected by the user. Accordingly, the URL 301 generated by the encoder 125 contains a URL parameter corresponding to each of the mobile devices 135 with values identifying the mobile devices 135 in the catalog 133 of the electronic commerce system 119.

Additionally, because, in the depicted example, there are two mobile devices 135 in the product bundle 303, the accessories associated with each mobile device are identified with URL parameters having parameter names that enable the decoder 129 to identify to which mobile device 135 represented in the URL 303 they correspond. In the depicted non-limiting example, the accessory products 137 associated with the URL parameters “acc1.0” and “acc1.1” are associated with a first mobile device, and the accessory product 137 associated with the URL parameter “acc2.0” are associated with a second mobile device. The decoder 129 can then validate the accessory compatibility with the mobile device 135. For example, if the mobile device 135 with which the Bluetooth headset accessory is associated does not have Bluetooth capability, the decoder 129 can generate an error.

In the depicted example, the mobile devices 135 can be associated with various service plans 139 that are encoded in the URL 301 by the encoder 125. For example, one of the mobile devices 135 is associated with a single service plan 139 that is represented by the value of the URL parameter “pl1.0.” The second mobile device 135 is associated with two service plans 139 that are represented by the value of the URL parameters “pl2.0” and “pl2.1.” Accordingly, the decoder 129 can validate whether each of the service plans 139 is compatible with the associated mobile device 135.

Additionally, in some embodiments, the encoder 125 can encode a bundle completion parameter which can specify various properties about a product bundle that may include multiple products, services, or other features. Accordingly, in one example, a user can generate a bundle that includes one or more products, services, mobile devices, service plans, and/or accessories, and allow another user to continue the addition of products and/or services to the bundle. To facilitate this functionality, the decoder 129 can validate whether the bundle completion parameter indicates whether a bundle defined by a user is complete. In other words, the parameter can indicate whether additional products and/or services should be added to the bundle. Accordingly, the user can resume configuration of the bundle at a later time or allow another user to resume configuration of the bundle by accessing the bundle with the URL generated by the encoder 125.

Figure 5:
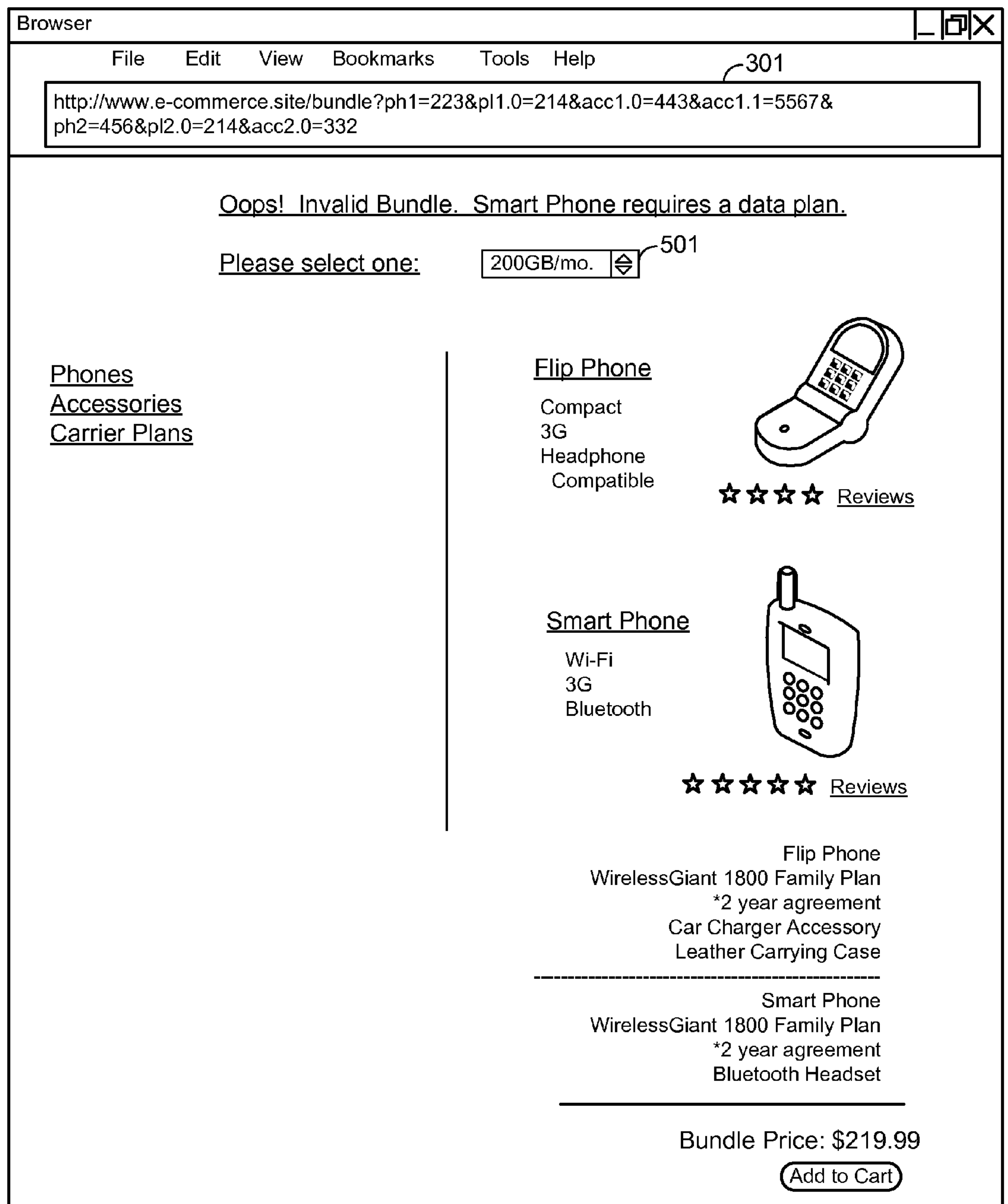
FIG. 5 is a drawing of an example of a network page rendered by a client in the networked environment of FIG. 1 according to various embodiments of the present disclosure.

Reference is now made to FIG. 5, which continues the example of FIG. 4 and illustrates an example of URL validation by the decoder 129. Continuing the example of FIG. 4, if a user deletes a URL parameter from the URL 301 and attempts to generate a corresponding product bundle 303, the decoder 129 can validate whether the bundle 303 is a valid bundle. In the depicted example, the “pl2.1” URL parameter, which corresponds to the “Unlimited Data Plan,” has been removed. However, in this non-limiting example, the corresponding phone requires some kind of data service plan 139 in order to purchase and activate. Accordingly, the decoder 139 can validate the bundle described by the URL 301 and return an error. Accordingly, the electronic commerce system 119 can display this error to the user in the network page 126 as well as prompt the user as to how the error can be remedied. In the depicted example, the electronic commerce system 119 can generate a user interface element 701 with which the user can select a data plan.

Figure 6:
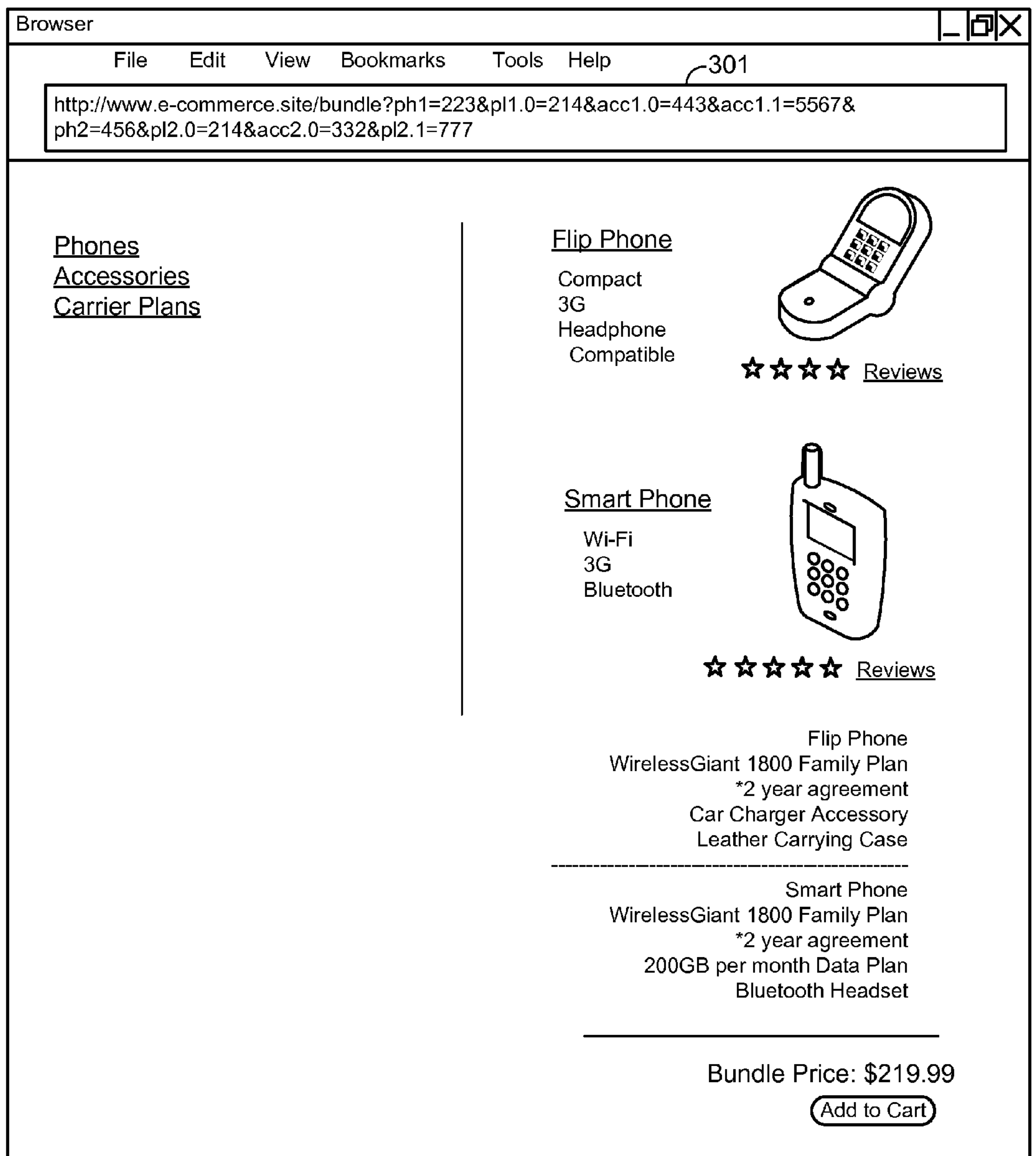
FIG. 6 is a drawing of an example of a network page rendered by a client in the networked environment of FIG. 1 according to various embodiments of the present disclosure.

Next, FIG. 6 depicts a network page 126 generated by the electronic commerce system 119 in which the error of FIG. 5 has been remedied. The user has selected a data service plan 139 by manipulating a user interface in the network page 126 rendered by the client to select a data service plan 139. Accordingly, the encoder 125 appends a URL parameter to the URL 301 with a value corresponding to the selected data service plan 139.

Figure 7:
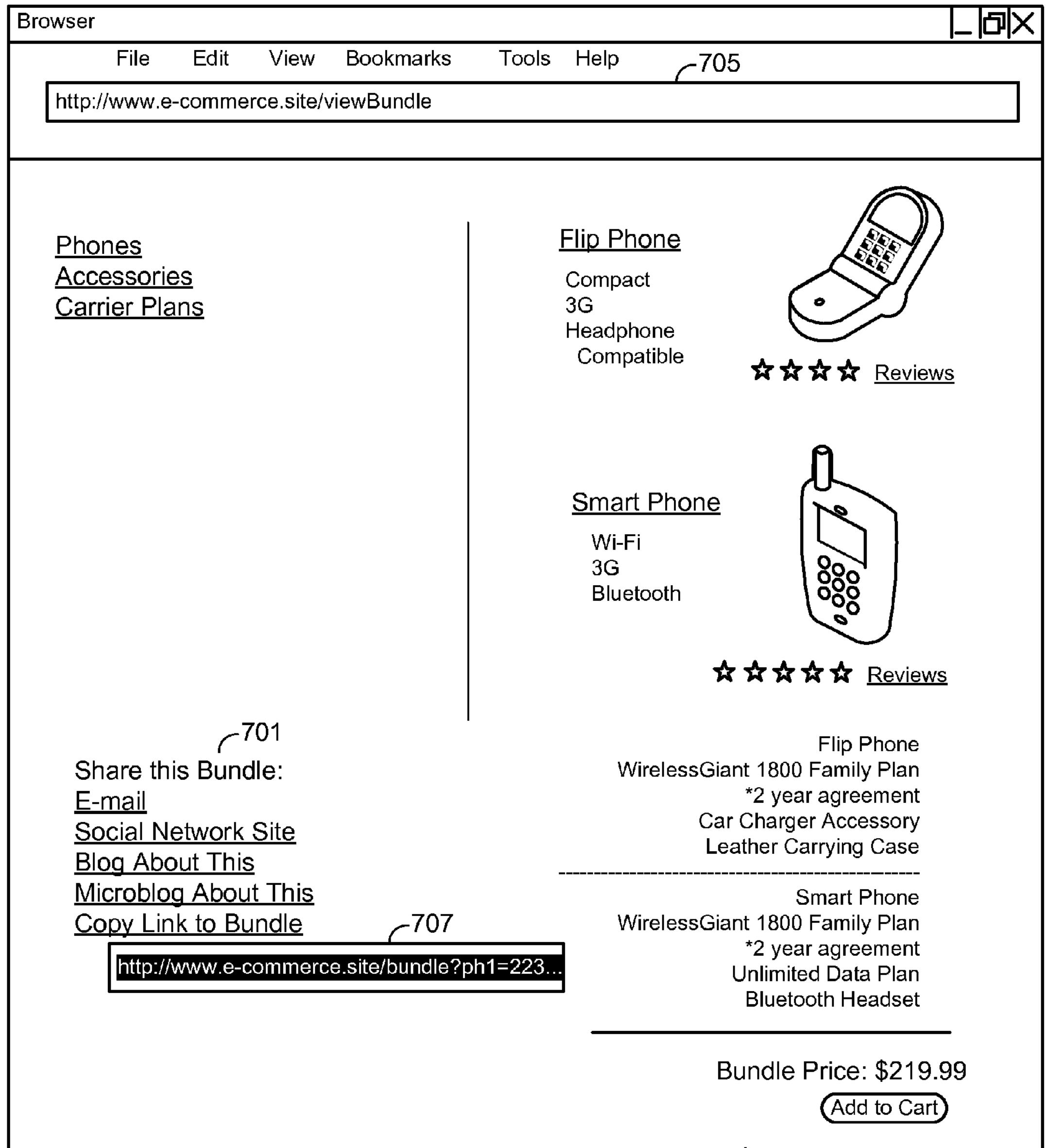
FIG. 7 is a drawing of an example of a network page rendered by a client in the networked environment of FIG. 1 according to various embodiments of the present disclosure.

Reference is now made to FIG. 7, which depicts additional functionality facilitated by the generating and validating of a URL 707 containing URL parameters that describe the mobile devices 135 and various features of a product bundle. As noted above, in many prior art systems configured to facilitate the purchase of wireless devices, the data relevant to the items and other features in a wireless device bundle are in form data or otherwise not embedded in the URL 707. Accordingly, in the depicted network page 126, a URL 707 according to embodiments of the disclosure can be generated by the encoder 125 when requested by a user via the sharing module 701 and employed by the electronic commerce system 119 to facilitate sharing functionality. In some embodiments, the URL 707 can be generated when requested by a user for sharing or other purposes, and not exposed to the user as the user navigates the electronic commerce system. In one embodiment, a clean URL 705 can be employed as the user navigates the electronic commerce system, and a parameterized URL 707 generated only when requested by the user for sharing purposes.

In the depicted non-limiting example, a hyperlink to the bundle can be e-mailed, posted in a social networking site, copied, etc. Because the relevant mobile devices 135 and other features (e.g., accessory products 137, service plans 139, etc.) are embedded in URL parameters of the URL 707, a hyperlink to the product bundle, with the same customizations as configured by a user, can be shared with others in various ways as depicted and as can further be appreciated.

Figure 8:
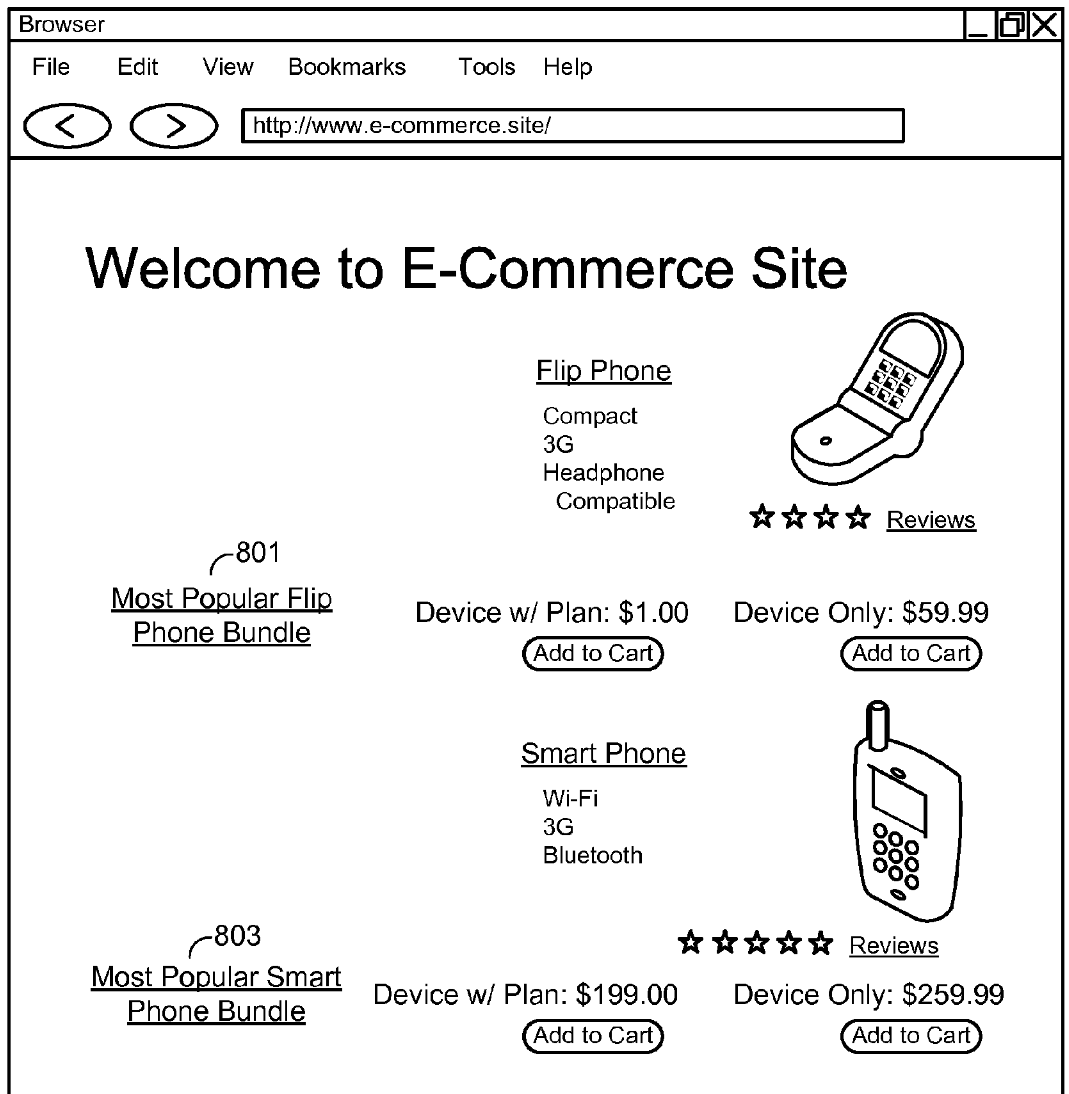
FIG. 8 is a drawing of an example of a network page rendered by a client in the networked environment of FIG. 1 according to various embodiments of the present disclosure.

Reference is now made to FIG. 8, which depicts additional functionality facilitated by the generating and validating of a URL 301 containing URL parameters that describe the mobile devices 135 and various features of a product bundle. In the depicted non-limiting example, the electronic commerce system 119 can track the most popular bundles including a mobile device 135, other products 137, service plans 139 and other customizations, and provide a hyperlink to these bundles. Accordingly, hyperlinks 801 and 803 can include a URL encoded as described herein that describes the various aspects of a specific product bundle. Additionally, because, in contrast to some prior art electronic commerce systems, the relevant data for the mobile devices 135, accessory or other products 137 and/or service plans 139 is embedded in the URL by the encoder 125, hyperlinks to specific product bundles can be exposed to search engines and other indexers. Accordingly, the functionality of the encoder 125 and decoder 129 can be utilized to drive more traffic to a site implemented by the electronic commerce system 119, as specific product bundles can be crawled by search engines and other indexers and subsequently appear in the search results of a search engine.

Figure 9:
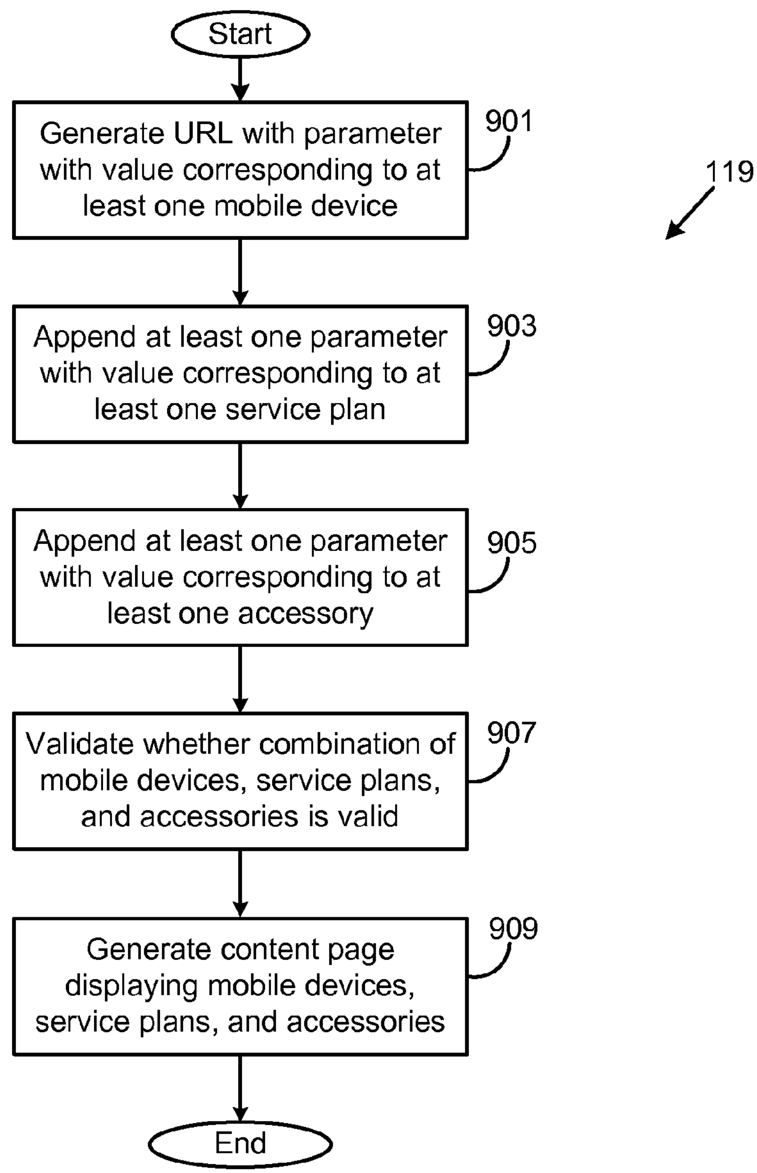
FIG. 9 is a flowchart illustrating one example of functionality implemented as portions of the electronic commerce system executed in a computing device in the networked environment of FIG. 1 according to various embodiments of the present disclosure.

Referring next to FIG. 9, shown is a flowchart that provides one example of the operation of a portion of the electronic commerce system 119 (FIG. 1) executing the encoder 125 (FIG. 1) and decoder 129 (FIG. 1) according to various embodiments. It is understood that the flowchart of FIG. 9 provides merely an example of the many different types of functional arrangements that may be employed to implement the operation of the portion of the electronic commerce system 119 as described herein. As an alternative, the flowchart of FIG. 9 may be viewed as depicting an example of steps of a method implemented in the computing device 103 (FIG. 1) according to one or more embodiments.

Beginning with box 901, a URL containing a parameter with a value corresponding to at least one mobile device 135 (FIG. 1) available in the catalog 133 (FIG. 1) of the electronic commerce system 119 is generated. In box 903, at least one parameter with a value corresponding to a service plan 139 (FIG. 1) is appended to the URL. In box 905, at least one parameter with a value corresponding to an accessory product 137 (FIG. 1) is appended to the URL. In box 907, the combination of the mobile device 135, accessory products 137 and service plans 139 are validated. In other words, the electronic commerce system 119 validates whether it constitutes a valid combination as described above. In box 909, a content page displaying the selected mobile devices, accessory products, and service plans is generated by the electronic commerce system 119 for rendering on a client 106.

Figure 10:
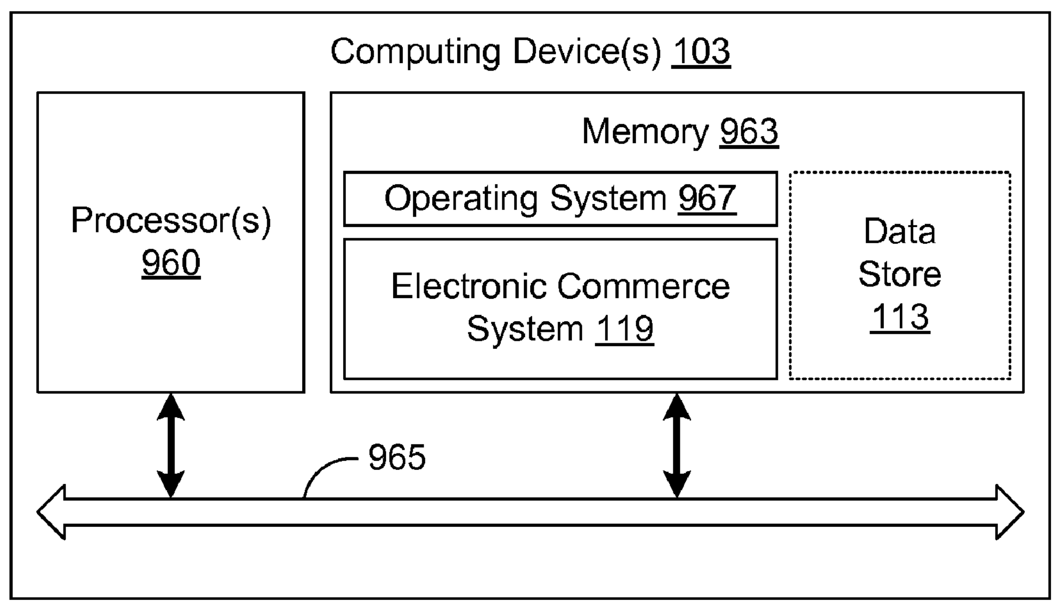
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 960 and a memory 963, both of which are coupled to a local interface 965. To this end, the computing device 103 may comprise, for example, at least one server computer or like device. The local interface 965 may comprise, for example, a data bus with an accompanying address/control bus or other bus structure as can be appreciated.

Stored in the memory 963 are both data and several components that are executable by the processor 960. In particular, stored in the memory 963 and executable by the processor 960 are an electronic commerce system 119, and potentially other applications. Also stored in the memory 963 may be a data store 113 and other data. In addition, an operating system 967 may be stored in the memory 963 and executable by the processor 960.

It is understood that there may be other applications that are stored in the memory 963 and are executable by the processors 960 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 963 and are executable by the processor 960. In this respect, the term "executable" means a program file that is in a form that can ultimately be run by the processor 960. Examples of executable programs may be, for example, a compiled program that can be translated into machine code in a format that can be loaded into a random access portion of the memory 963 and run by the processor 960, source code that may be expressed in proper format such as object code that is capable of being loaded into a random access portion of the memory 963 and executed by the processor 960, or source code that may be interpreted by another executable program to generate instructions in a random access portion of the memory 963 to be executed by the processor 960, etc. An executable program may be stored in any portion or component of the memory 963 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 963 is defined herein as including both volatile and nonvolatile memory and data storage components. Volatile components are those that do not retain data values upon loss of power. Nonvolatile components are those that retain data upon a loss of power. Thus, the memory 963 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 960 may represent multiple processors 960 and the memory 963 may represent multiple memories 963 that operate in parallel processing circuits, respectively. In such a case, the local interface 965 may be an appropriate network 113 (FIG. 1) that facilitates communication between any two of the multiple processors 960, between any processor 960 and any of the memories 963, or between any two of the memories 963, etc. The local interface 965 may comprise additional systems designed to coordinate this communication, including, for example, performing load balancing. The processor 960 may be of electrical or of some other available construction.

Although the electronic commerce system 119 and other various systems described herein may be embodied in software or code executed by general purpose hardware as discussed above. As an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 9 shows the functionality and operation of an implementation of portions of the electronic commerce system 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 960 in a computer system or other system. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 119, encoder 125 and/or decoder 129, that comprises software or code can be embodied in any non-transitory computer-readable medium for use by or in connection with an instruction execution system such as, for example, a processor 960 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that implements an electronic commerce system configured to provide a plurality of mobile devices available for sale to users of the electronic commerce system;

code that generates, in the electronic commerce system, a uniform resource locator (URL), the URL having a first device parameter with a value corresponding to a first device identifier for a first mobile device, the first mobile device identifier uniquely identifying the first mobile device in the electronic commerce system, the URL having a second device parameter with a value corresponding to a second device identifier uniquely identifying a second mobile device in the electronic commerce system;

code that appends to the URL, in the electronic commerce system, a first service plan parameter having a value corresponding to a first service plan identifier, the first service plan identifier uniquely identifying a first service plan available via the electronic commerce system, the first service plan parameter having a first parameter name containing at least one identifier associated with a name of the first device parameter;

code that appends to the URL, in the electronic commerce system, a second service plan parameter having a value corresponding to a second service plan identifier, the second service plan identifier uniquely identifying a second service plan in the electronic commerce system, the second service plan parameter having a second parameter name containing at least one identifier associated with a name of the second device parameter;

code that appends to the URL, in the electronic commerce system, a first accessory parameter having a value corresponding to a first accessory identifier, the first accessory identifier uniquely identifying a first accessory available via the electronic commerce system, the first accessory parameter having a first accessory parameter name containing at least one identifier associated with the name of the first device parameter;

code that appends to the URL, in the electronic commerce system, a second accessory parameter having a value corresponding to a second accessory identifier, the second accessory identifier uniquely identifying an a second accessory available via the electronic commerce system, the second accessory parameter having a second accessory parameter name containing at least one identifier associated with the name of the second device parameter;

code that validates whether the first service plan corresponding to the first service plan parameter is compatible with the first mobile device;

code that validates whether the second service plan corresponding to the second service plan parameter is compatible with the second mobile device;

code that validates whether the first accessory corresponding to the first accessory parameter is compatible with the first mobile device; and code that validates whether the second accessory corresponding to the second accessory parameter is compatible with the second mobile device;

code that generates, in the electronic commerce system, a content page displaying information about the first mobile device, the second mobile device, the first service plan, the second service plan, the first accessory and the second accessory.

2. A system, comprising:

at least one computing device; and an electronic commerce system executable in the at least one computing device, the electronic commerce system comprising:

logic that generates a uniform resource locator (URL), the URL having a first parameter associated with a first product, the first parameter having a value corresponding to a product identifier, the product identifier identifying a product in a catalog of the electronic commerce system, the first parameter having a first parameter name uniquely identifying the first parameter within the URL, the URL having a second parameter with a value corresponding to a product identifier and a second parameter name uniquely identifying the second parameter within the URL;

logic that appends to the URL a first additional parameter corresponding to the first parameter, the first additional parameter having a first additional parameter name comprising at least one identifier associated with the first parameter name, the first additional parameter further corresponding to a configurable feature associated with a purchase of the product associated with the first parameter;

logic that appends to the URL a second additional parameter corresponding to the second parameter, the second additional parameter having a second additional parameter name comprising at least one identifier associated with the second parameter name, the second additional parameter further corresponding to a configurable feature associated with a purchase of the product associated with the second parameter;

logic that validates whether the value of the first parameter corresponds to a valid product in the catalog;

logic that validates whether the value of the second parameter corresponds to a valid product in the catalog;

logic that validates whether the value of the first additional parameter corresponds to a valid configurable feature in the catalog;

logic that validates whether the value of the second additional parameter corresponds to a valid configurable feature in the catalog;

logic that generates a content page containing information about the first product, the second product, the first configurable feature, and the second configurable feature.

3. The system of claim 2, further comprising logic that validates whether a combination of the first product and first configurable feature is compatible, and whether a combination of the second product and second configurable feature is compatible.

4. The system of claim 2, wherein the logic that validates whether the values of the first parameter and the second parameter correspond to a valid products in the catalog further comprises generating a suggestion for a replacement product for the at least one of the first product and the second product.

5. The system of claim 2, wherein the logic that validates whether the value of the first additional parameter and second additional parameter correspond to a valid configurable features in the catalog further comprises generating a suggestion for at least one replacement configurable feature for at least one of the first configurable feature and the second configurable feature.

6. The system of claim 2, wherein the first product and the second product are at least one mobile device and the first configurable feature and the second configurable feature are at least one service plan associated with each of the first mobile device and the second mobile device, and the first additional parameter and the second additional parameter have values corresponding to a service plan identifier that identifies a respective service plan for each of the first mobile device and the second mobile device.

7. The system of claim 6, further comprising logic that appends to the URL a first accessory parameter, the first accessory parameter having a value corresponding to at least one mobile device accessory, the first accessory parameter further having a first accessory parameter name comprising at least one identifier associated with the first parameter name; and logic that appends to the URL a second accessory parameter, the second accessory parameter having a value corresponding to at least one mobile device accessory, the second accessory parameter further having a second accessory parameter name comprising at least one identifier associated with the second parameter name.

8. The system of claim 7, further comprising logic that validates that the first mobile device accessory is compatible with the first product and logic that validates that the second mobile device accessory is compatible with the second product.

9. The system of claim 2, further comprising logic that groups parameters corresponding to the first product together into a first parameter group and parameters corresponding to the second product together into a second parameter group, the first parameter group and the second parameter group separated by a delimiting character.

10. The system of claim 2, further comprising:

logic that generates a hyperlink to the URL; and logic that exposes the hyperlink to at least one search engine.

11. The system of claim 2, further comprising the logic that encodes for display a user interface element facilitating sharing of the URL.

12. A method, comprising the steps of:

generating, in at least one computing device executing an electronic commerce system configured to provide a plurality of mobile devices for sale, a uniform resource locator (URL), the URL having a first parameter with a value corresponding to a first device identifier associated with a first mobile device, the first device identifier identifying the first mobile device in the electronic commerce system, the URL further having a second parameter with a value corresponding to a second device identifier associated with a second mobile device, the second device identifier identifying the second mobile device in the electronic commerce system;

appending to the URL, in the at least one computing device, a first additional parameter associated with the first mobile device, the first additional parameter corresponding to at least one configurable feature associated with a purchase of the first mobile device;

appending to the URL, in the at least one computing device, a second additional parameter associated with the second mobile device, the second additional parameter corresponding to at least one configurable feature associated with a purchase of the second mobile device;

generating, in the at least one computing device, a content page displaying the first mobile device, the second mobile device, the first configurable feature, and the second configurable feature associated with the purchase of the first mobile device and the second mobile device.

13. The method of claim 12, further comprising the steps of:

validating the first parameter, the second parameter, the first additional parameter, and the second additional parameter; and validating the values of the first parameter, the second parameter, the first additional parameter, and the second additional parameter.

14. The method of claim 13, wherein the step of validating the first parameter, the second parameter, the first additional parameter, and the second additional parameter further comprises verifying that the first parameter, the second parameter, the first additional parameter, and the second additional parameter respectively correspond to a valid parameter and a valid additional parameter in the electronic commerce system.

15. The method of claim 12, further comprising the step of appending to the URL a bundle completion parameter, the bundle completion parameter indicating whether a mobile device bundle defined by the first parameter and the first additional parameter is complete.

16. The method of claim 15, further comprising the step of:

generating, in the at least one computing device, a content page prompting a user to add at least one of a mobile device and at least one configurable feature to the mobile device bundle if the bundle completion parameter indicates that the mobile device bundle is incomplete.

17. The method of claim 13, wherein the step of validating the values of the first parameter, the second parameter, the first additional parameter and the second additional parameter further comprises verifying that the value of the first parameter and the second parameter corresponds to a valid mobile device available in the electronic commerce system and the value of the first additional parameter and the second additional parameter corresponds to a valid configurable feature available in the electronic commerce system.

18. The method of claim 14, wherein the step of validating the values of the first parameter, the second parameter, the first additional parameter and the second additional parameter further comprises verifying whether a combination of the first mobile device corresponding to the value of the first parameter and a first configurable feature corresponding to the value of the first additional parameter correspond to a valid combination.

19. The method of claim 12, wherein the first configurable feature is first service plan associated with each of the at least one mobile device, and the at least one additional parameter has a value corresponding to a service plan identifier that identifies a service plan for each of the at least one mobile device.

20. The method of claim 12, further comprising appending to the URL, in the at least one computing device, a first service plan option parameter, the service plan option parameter having a value corresponding to a service plan option for the first mobile device, and appending to the URL, in the at least one computing device, a second service plan option parameter having a value corresponding to a service plan option for the second mobile device.

21. The method of claim 12, further comprising appending to the URL, in the at least one computing device, a first accessory parameter, the first accessory parameter having a value corresponding to a first mobile device accessory.

22. The method of claim 21, further comprising the step of validating that the first mobile device accessory is compatible with the first mobile device.

23. The method of claim 12, further comprising the step of grouping parameters corresponding to the first mobile device and the second mobile device into respective parameter groups, the parameter groups separated by a delimiting character.

24. The method of claim 12, further comprising the steps of:

generating a hyperlink to the URL; and exposing the hyperlink to at least one search engine.

25. The method of claim 12, further comprising the step of encoding, on the at least one content page, a user interface element facilitating sharing of the URL.

* * * * *